Sept. 18, 1956

E. D. NEELY 2,763,077

AUTOMOBILE LICENSE PLATE HOLDER

Filed Jan. 29, 1953

INVENTOR.
ESKEL D. NEELY
BY Arthur J. Robert

ATTORNEY

United States Patent Office 2,763,077
Patented Sept. 18, 1956

2,763,077

AUTOMOBILE LICENSE PLATE HOLDER

Eskel D. Neely, New Albany, Ind.

Application January 29, 1953, Serial No. 333,904

5 Claims. (Cl. 40—125)

The present invention relates to a license plate holder for automobiles which is designed to prevent easy removal of the license holder.

This application is a continuation in part of my application Serial Number 330,073, filed January 7, 1953, for automobile license holder.

It is an object of this invention to provide a more simple license plate holder designed for attachment to a part of the automobile which is normally locked so that neither the license plate holder nor the license plate can be removed without unlocking the locked part of the automobile.

The invention will be described in greater detail in connection with the accompanying drawing illustrating a preferred embodiment of the invention by way of example, and wherein.

Figure 1:
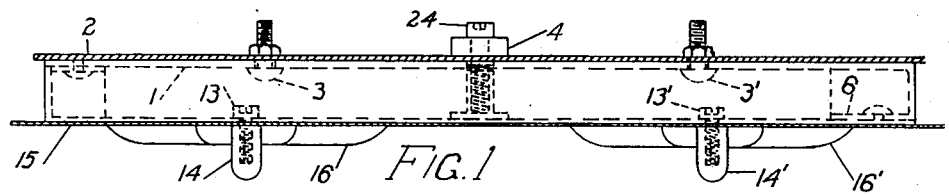
Figure 1 is a plan view of the license plate holder assembled to the trunk deck of an automobile, the deck and license plate being shown in section.

Referring to the drawing, a plate 1 is fastened to the deck 2 of the trunk compartment of an automobile, as for example, by bolts 3, 3' passing through holes drilled into the deck and secured by nuts threaded on the ends thereof. A hole is also drilled in the deck to accommodate the sleeve 4 carried by the plate. The plate 1 has a lower flange 5, and at one end has a doubled back flange 6 integral therewith, this latter flange having a slot 7 therein. At its opposite end the plate has an undercut boss 8 in the form of a headed rivet, or the like.

The front plate 11 has slots 12 and 12' therein adapted to receive bolts 13, 13' which are threaded into the oblong nuts 14, 14' so as to clamp a license plate 15 therebetween. The bottoms of nuts 14, 14' engage the bars 16, 16' integrally secured to the front plate 11 and thus the nuts 14, 14' cannot be turned. The bars 16, 16' and nuts are shaped to provide an ornamental appearance. It will be seen that the license plate is carried on the front plate 11, and to remove this plate it is necessary to turn the screws 13, 13'.

Figure 4:
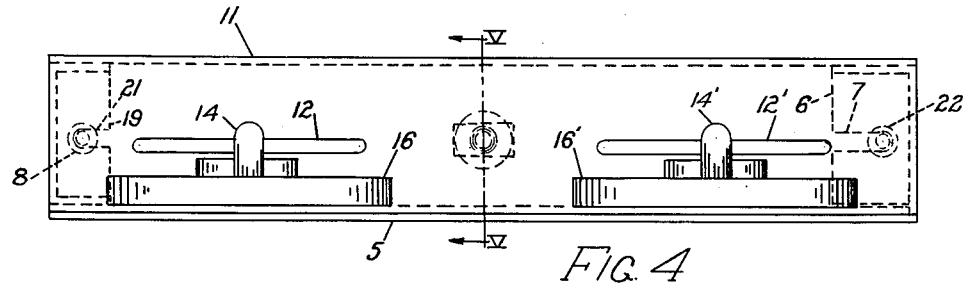
Figure 4 is a front elevation of the assembled holder.
Figure 5:
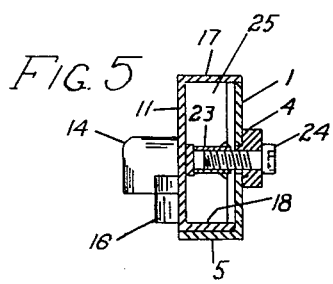
Figure 5 is a section taken on line V—V of Figure 4.

Plate 11 has a top flange 17 and a bottom flange 18, and in assembled position, as shown in Figures 4 and 5, the top flange 17 overlies the top edge of the rear plate 1, and the bottom flange 18 overlaps the bottom flange 5 of the rear plate. At one end plate 11 has a doubled back flange 19 with a slot 21 therein, and at its other end the plate carries an undercut boss 22 in the form of a headed rivet. Near the middle the plate carries a sleeve or nut 23 suitably attached thereto, as by welding. In assembled position the slot 21 in flange 19 receives the shank of rivet 8, and slot 7 of flange 6 receives the shank of rivet 22. A bolt 24 passing through the sleeve 4 is threaded into nut 23, thus holding the plates assembled to provide an enclosed chamber 25 therebetween.

Figure 2:
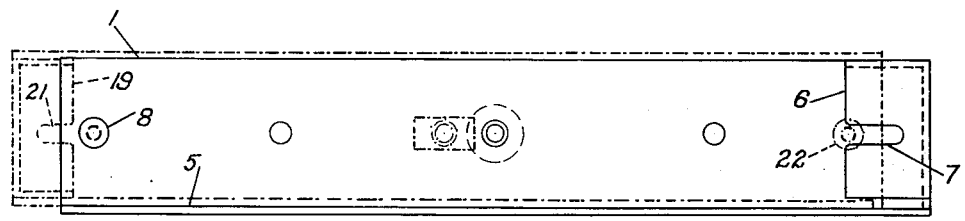
Figure 2 is a front elevation of the rear plate, the front plate being superposed in dot and dash lines.
Figure 3:
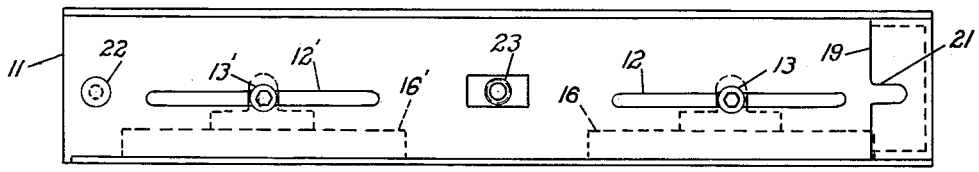
Figure 3 is a rear elevation of the front plate.

The operation now will be described. Suitable holes are drilled in the trunk deck of the automobile to accommodate bolts 3, 3' and sleeve 4, and the plate 1 is secured to the deck by the bolts 3, 3' passing through these holes and through plate 1 and secured by nuts accessible from the inside of the deck. The license plate is attached to plate 11 by the bolts 13, 13' passing through the slots 12, 12', through holes in the license plate, and into nuts 14, 14'. The top plate now is placed in the position shown in Figure 2 by dot and dash lines, and by sliding the top plate to the right the rivet 22 is moved into slot 7, while flange 19 having slot 21 therein receives the rivet 8. The two plates are held in this position by bolt 24 passing through sleeve 4 in plate 1 and threaded into nut 23.

It will be seen that the heads of bolts 13, 13' are in chamber 25 which is entirely enclosed by plates 1, 11, and flanges 17, 19, 18, 5 and 6, and as nuts 14, 14' are held against turning by the bars 16, 16', the license plate can be removed only by removing plate 11 to allow access to the bolt heads. Also, the bolt 24, which holds the plates 1 and 11 assembled can be turned only from the inner side of the trunk deck. As the deck is locked, it is not possible to remove the license plate without first unlocking the deck, and thus unauthorized removal of the license plate is prevented. Neither can the holder be removed from the automobile, because the nuts which hold bolts 3, 3', are in the trunk compartment and are accessible only upon unlocking the trunk.

I claim as my invention:

1. A license plate holder comprising: an outer frame having an outer frame wall presenting inner and outer sides; means operable from the inner side of said outer frame for clamping a license plate against the outer side of said outer frame wall; a base frame adapted to be positioned on and rigidly secured to the outer side of a vehicle wall; and means operable from the inner side of said vehicle wall for detachably holding said outer frame in assembled relationship upon said base frame wherein both frames cooperate to form a chamber enclosing the operable end of said license plate clamping means and preventing access thereto so long as said frames remain in assembled relationship, said holding means extending from said outer frame successively through said chamber, base frame and vehicle wall.

2. The holder of claim 1 wherein: said holding means terminates on the inner side of said vehicle wall in an operating element which is manipulatable to cause the holding means to hold the outer and base frames in assembled relationship or to release the outer frame and permit disassembly.

3. The holder of claim 2 wherein: said holding means include an internally threaded socket on said outer frame and a bolt threadedly engageable with said socket and manipulatable from the inner side of said vehicle wall.

4. The holder of claim 1 wherein: said base frame and outer frame are assembled and disassembled by relative sliding movement and said holding means secures said frames against sliding movement.

5. The holder of claim 4 including: interlocking means between said frames adjacent the ends for releasably holding said frames together in slidable engagement.

References Cited in the file of this patent

UNITED STATES PATENTS

| 1,561,420 | Elliott | Nov. 10, 1925 |
| 1,587,952 | Hartman | June 8, 1926 |
| 1,950,205 | Young | Mar. 6, 1934 |